(12) United States Patent
Revankar et al.

(10) Patent No.: US 7,943,108 B2
(45) Date of Patent: May 17, 2011

(54) PROCESSES FOR PURIFICATION OF SILICON TETRAFLUORIDE

(75) Inventors: Vithal Revankar, Seabrook, TX (US); Jameel Ibrahim, Humble, TX (US)

(73) Assignee: MEMC Electronic Materials, Inc., St. Peters, MO (US)

( * ) Notice: Subject to any disclaimer, the term of this patent is extended or adjusted under 35 U.S.C. 154(b) by 0 days.

(21) Appl. No.: 12/208,464

(22) Filed: Sep. 11, 2008

(65) Prior Publication Data

US 2009/0092534 A1 Apr. 9, 2009

Related U.S. Application Data

(60) Provisional application No. 60/974,182, filed on Sep. 21, 2007.

(51) Int. Cl.
*C01B 33/08* (2006.01)
(52) U.S. Cl. ........ 423/341; 423/246; 502/241; 502/244; 502/243; 502/255; 502/260; 502/263; 502/308; 502/320; 502/322; 502/321; 502/319; 502/324; 502/332; 502/325; 502/346; 502/345; 502/347; 502/348; 502/355; 502/302; 502/341; 502/306; 502/328; 502/349; 502/354
(58) Field of Classification Search .......... 502/241, 502/244, 243, 255, 256, 260, 263, 308, 320, 502/322, 321, 319, 324, 332, 325, 346, 345, 502/347, 348, 355, 302, 341, 306, 328, 349, 502/354; 423/341, 246
See application file for complete search history.

(56) References Cited

U.S. PATENT DOCUMENTS

| | | | | |
|---|---|---|---|---|
| 3,984,519 A | * | 10/1976 | Dolci et al. | 423/4 |
| 4,044,100 A | * | 8/1977 | McElroy, Jr. | 423/226 |
| 4,714,604 A | * | 12/1987 | Olson | 423/488 |
| 4,900,530 A | | 2/1990 | Anania et al. | |
| 5,238,670 A | | 8/1993 | Louise et al. | |
| 5,833,738 A | * | 11/1998 | Carrea et al. | 95/115 |
| 6,884,752 B2 | | 4/2005 | Andrews | |
| 2003/0183503 A1 | * | 10/2003 | Fujii | 204/157.3 |
| 2005/0241478 A1 | * | 11/2005 | Junicke et al. | 95/140 |
| 2006/0133986 A1 | | 6/2006 | Dukhedin-Lalla et al. | |
| 2007/0003466 A1 | | 1/2007 | Oka | |

OTHER PUBLICATIONS

Labaki et al., Total Oxidation of Propene and Toluene on Copper/Yttrium Doped Zirconia, 2004, Kinetics and Catalysis, vol. 45(2), p. 227-233.
Bach et al., Fabrication and Characterization of Zirconia-Toughened Alumina Obtained by Inorganic and Organic Precursors, 1989, Journal of Materials Science, vol. 24, p. 2711-2721.
Kan et al., Yb2O3 and Y2O2 co-doped zirconia ceramics, 2006, Journal of the European Ceramic Society, vol. 26, p. 3607-3612.

(Continued)

*Primary Examiner* — Jerry Lorengo
*Assistant Examiner* — Pritesh Darji
(74) *Attorney, Agent, or Firm* — Armstrong Teasdale LLP

(57) ABSTRACT

Processes for purifying silicon tetrafluoride source gas by subjecting the source gas to one or more purification processes including: contacting the silicon tetrafluoride source gas with an ion exchange resin to remove acidic contaminants, contacting the silicon tetrafluoride source gas with a catalyst to remove carbon monoxide, by removal of carbon dioxide by use of an absorption liquid, and by removal of inert compounds by cryogenic distillation; catalysts suitable for removal of carbon monoxide from silicon tetrafluoride source gas and processes for producing such catalysts.

24 Claims, 2 Drawing Sheets

OTHER PUBLICATIONS

Office Action dated Dec. 29, 2009 for U.S. Appl. No. 12/563,565, filed Sep. 21, 2009.
Co-owned U.S. Appl. No. 12/563,565, filed Sep. 21, 2009.
Co-owned U.S. Appl. No. 12/563,572, filed Sep. 21, 2009.
Chin-Cheng et al., "Effect of Oxygen Vacancy on CO-NO-O2 Reaction over Yttria-Stabilized Zirconia-Supported Copper Oxide Catalyst", Industrial & Engineering Chemistry Research, vol. 36, 1997, pp. 1544-1551.
Invitation to Pay Additional Fees and Communication Relating to the Results of the Partial International Search mailed Apr. 5, 2010 in International Application No. PCT/US2008/076027.
Final Office Action for U.S. Appl. No. 12/563,565 mailed Jun. 25, 2010.

* cited by examiner

PROCESSES FOR PURIFICATION OF SILICON TETRAFLUORIDE

REFERENCE TO RELATED APPLICATION

This application claims priority from U.S. provisional application, U.S. Ser. No. 60/974,182, filed on Sep. 21, 2007.

BACKGROUND OF THE INVENTION

This invention relates to the purification of a silicon tetrafluoride gas by removal of acidic compounds, carbon monoxide, carbon dioxide, inert compounds and combinations thereof and, more particularly, to the removal of acidic compounds by use of an ion exchange resin, removal of carbon monoxide by use of a catalyst comprising a catalytic metal oxide on or near the surface of an inert substrate, by removal of carbon dioxide by use of an absorption liquid comprising at least one glycol diether, by removal of inert gases by use of a cryogenic distillation process and combinations thereof.

Polycrystalline silicon is a vital component of many commercial products including, for example, integrated circuits and photovoltaic (i.e., solar) cells. Polycrystalline silicon is typically produced by a chemical vapor deposition mechanism in which silicon is deposited from a thermally decomposable silicon compound, typically silane, onto a crystal seed particle in a fluidized bed reactor. Silane may be produced from silicon tetrafluoride by a reaction between silicon tetrafluoride and a metal hydride such as sodium aluminum tetrahydride ($NaAlH_4$).

Silicon tetrafluoride can be produced by a variety of methods, for example, as a gas from fluorosilicic acid, a by-product in the production of phosphate fertilizers. Commercially produced silicon tetrafluoride gas typically contains a number of impurities such as carbon monoxide, carbon dioxide, inert compounds, metal impurities such as boron, phosphorous and calcium compounds and acid compounds such as hydrochloric acid, sulfur dioxide, sulfur trioxide and hydrofluoric acid. These impurities can cause defects and possibly failure of the microelectronic device. Thus a need exists for processes which reduce the impurities from commercially produced silicon tetrafluoride source gas.

SUMMARY OF THE INVENTION

According to one aspect, a process for producing a purified silicon tetrafluoride gas comprises contacting a silicon tetrafluoride source gas with a catalyst. The silicon tetrafluoride source gas comprises silicon tetrafluoride and carbon monoxide. The catalyst comprises an inert substrate and a catalytic metal oxide at or near the surface of the inert substrate. At least a portion of the carbon monoxide is adsorbed onto the surface of the catalyst by reacting the carbon monoxide with the catalytic metal oxide. This reaction forms one or more metal carbonyl complexes. This results in production of a purified silicon tetrafluoride gas stream having a reduced concentration of carbon monoxide.

According to a further aspect, a catalyst for removing impurities from a silicon tetrafluoride gas comprises an inert substrate selected from the group consisting of zirconia, alumina silicate, silica, alumina, yttria and mixtures thereof. The catalyst comprises a catalytic metal oxide comprising a catalytic metal selected from the group consisting of copper, manganese, chromium, cobalt, thallium, molybdenum, silver and mixtures thereof at or near the surface of the inert substrate.

In yet a further aspect, a process for preparing a catalyst comprising an inert substrate and a catalytic metal oxide at or near the surface of the inert substrate comprises impregnating catalytic metal on the surface of or throughout the bulk of the inert substrate. The metal-impregnated inert substrate is heated to a temperature of at least about 1000° C. to form a catalytic metal oxide at or near the surface of the inert substrate.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Among the various aspects of the present invention are processes for purifying silicon tetrafluoride source gas. Purification techniques include, for example, removal of acidic gases from a silicon tetrafluoride source gas by use of an ion exchange resin, removal of carbon monoxide by use of a catalyst, removal of carbon dioxide by use of an absorption liquid comprising at least one glycol diether, removal of inert gases by use of cryogenic distillation and combinations thereof.

Among further aspects of the present invention are a process for purifying silicon tetrafluoride source gas by contacting the gas with a catalyst comprising an inert substrate and a metal oxide at or near the surface of the inert substrate, a catalyst comprising an inert substrate and a metal oxide at or near the surface of the inert substrate, and a process for producing such a catalyst.

Figure 1:
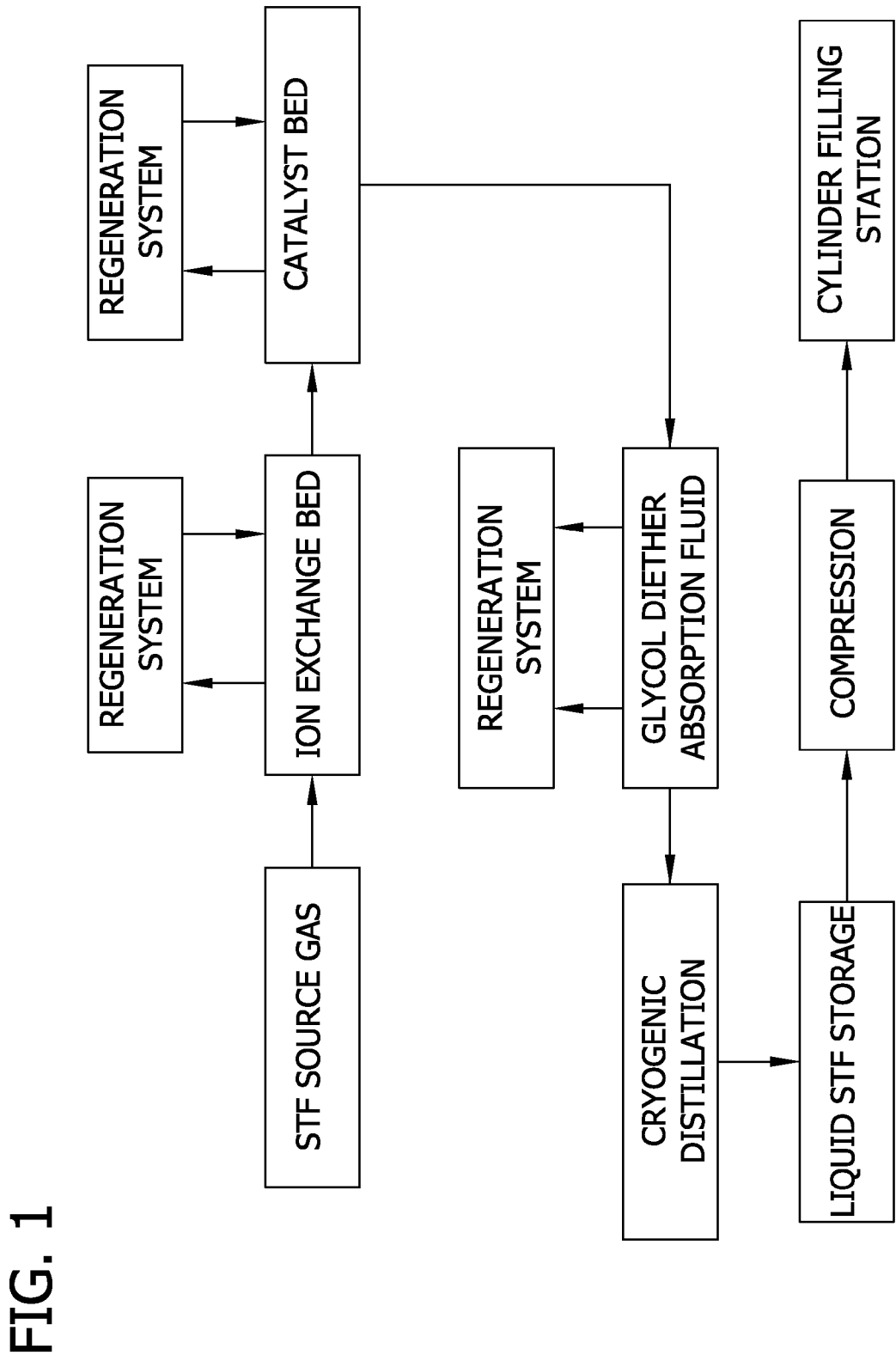
FIG. 1 is a block diagram illustrating a flow scheme for purification of a silicon tetrafluoride source gas according to one embodiment of the invention.

According to process of embodiments of the present invention, a silicon tetrafluoride source gas comprising impurities is subjected to one or more purification steps to remove a portion or all of the impurities. For example, as shown in FIG. 1, the source gas may be contacted with an ion exchange resin to remove a portion or all of the acidic gases present as well as at least some portion or all of any moisture present in the gaseous stream. Alternatively or in addition, the source gas may be contacted with one or more catalyst(s) to remove a portion or all of any carbon monoxide present. Alternatively or in addition, the source gas may be contacted with an absorption liquid to remove carbon dioxide. Separate regeneration systems may be used to regenerate the ion exchange material, catalyst and absorption liquid. Finally, alternatively or in addition to the prior purification steps, the silicon tetrafluoride source gas can be sent to a cryogenic distillation unit to remove inert gas. After the cryogenic distillation, the silicon tetrafluoride may be stored as a liquid and further compressed for cylinder filing.

While FIG. 1 illustrates the overall process including each of the purification steps described above in series in a particular order, it should be noted that one or more purification steps may be omitted without departing from the scope of the present invention. Furthermore, the purification steps may be carried out in any combination, however as discussed in more detail below some process sequences over synergistic benefits over others. While it is preferred that the purification steps be carried out in series, they may also be carried out in parallel although such a process scheme may reduce the total amount of impurities removed during the overall process. While not indicated by FIG. 1, the purified silicon tetrafluoride gas can be sent to compression and cylinder filling after any purification step. The purification steps may be reordered and/or omitted entirely without departing from the scope of the present invention.

A. Removal of Acidic Compounds by Use of an Ion Exchange Resin

Silicon tetrafluoride source gas often comprises acidic compounds such as hydrogen fluoride, hydrochloric acid, sulfur dioxide, sulfur trioxide, hydrogen sulfide and mixtures thereof. According to one embodiment, a portion of the silicon tetrafluoride source gas is contacted with an ion exchange bed to produce a purified silicon tetrafluoride gas stream having a reduced concentration of acidic compounds.

The ion exchange bed typically comprises one or more ion exchange resins. Suitable ion exchange resins are readily known to those skilled in the art and can be found in the literature (See e.g., Perry's Chemical Engineering Handbook, 7th Ed., Table 16-6, pp. 16-10). Typically, anion exchange resins are used to remove the negatively charged component of the acid compounds (e.g., fluoride, chloride). Suitable resins include polystyrene-based resins and cellulose-based resins. Suitable polystyrene-based resins include trimethyl benyzl ammonium and dimethyl hydroxyethyl ammonium. Suitable cellulose-based resins include ethyl trimethyl ammonium, triethyl hydroxypropyl ammonium, amino ethyl and diethyl aminoethyl.

In at least one embodiment, the ion exchange resin(s) may be recharged by flushing with a solution comprising a mineral acid and an organic solvent. Suitable mineral acids include hyrdochloric acid, nitric acid and sulfuric acid. Suitable organic solvents include alkanols.

Optionally or in addition, the silicon tetrafluoride source gas may be contacted with an ion exchange resin, such as those listed above, to remove non-acidic compounds such as, for example, hydrocarbons, carbon monoxide and carbon dioxide.

B. Catalytic Purification of Impurities Such as Carbon Monoxide

In at least some embodiments of the present invention a silicon tetrafluoride source gas is contacted with a catalyst comprising an inert substrate and a catalytic metal oxide at or near the surface of the inert substrate.

In at least some embodiments, the catalyst comprises an inert substrate selected from the group consisting of zirconia, alumina silicate, silica, alumina, yttria and mixtures thereof and a catalytic metal oxide comprising a catalytic metal selected from the group consisting of copper, manganese, chromium, cobalt, thallium, molybdenum, silver and mixtures thereof at or near the surface of the inert substrate. While the catalyst is very well suited for the removal of carbon monoxide from a silicon tetrafluoride source gas, it should be understood that the catalyst is capable of removing other compounds and is capable of removing compounds from source gases other than silicon tetrafluoride source gas.

1. Catalyst

The catalyst of the present invention comprises an inert substrate and a catalytic metal oxide at or near the surface of the inert substrate. The catalyst typically has a large specific surface area and high porosity to enhance the selectivity. Typically, the catalyst exhibits microporosity (i.e., porosity at the molecular level). Furthermore, it is preferred that the catalyst be such that exposure to acidic environment such as hydrochloric acid, sulfur dioxide, sulfur trioxide and hydrofluoric acid do not substantially degrade the performance of the catalyst. In this regard, it is preferred that the catalyst be non-reactive with the above listed acids.

I. Substrate

Suitable inert substrates include, for example, zirconia, alumina silicate, silica, alumina, yttria and mixtures thereof. Other substrates such as zeolites and clays exhibit the requisite porosity, however they are typically more susceptible to degradation when contacted with acidic compounds. In this regard, it may be preferable to remove acidic compounds from the gas streams prior to contacting them with a catalyst comprising one or more substrates comprising zeolites and/or clays.

A substrate with the requisite bulk porosity and microporosity may be produced by exposing a compound containing the metal (e.g., zirconium, silicon, aluminum, and yttrium) to a hydrogen and oxygen flame. The metal compound decomposes to form a metal oxide powder (e.g., zirconia, alumina silicate, silica, alumina, yttria). The powder may be combined with a binder and molded to form a substrate body. The substrate body is then heated to release previously absorbed hydrogen, thereby creating pores at both a macro and micro scale. The temperature to which the substrate body is heated should be sufficiently high to allow release of the previously absorbed hydrogen. Typically, the substrate body is heated to a temperature of at least about 300° C. In some embodiments the substrate body is heated to a temperature of at least about 400° C., at least about 500° C. or even at least about 600° C. It should be noted, however, that depending on the substrate used, temperatures above about 1000° C. may cause sintering and loss of the micropore structure of the substrate. In such cases, the temperature at which the substrate body is heated to release the previously absorbed hydrogen may be less than about 1,000° C. Typically, therefore, the substrate body is heated to a temperature of from about 300° C. to about 1,000° C. and, more typically, from about 400° C. to about 600° C.

Phase stabilizing additives may be added to the inert substrate. Suitable additives include metal oxide stabilizers that comprise a metal such as, for example, a lanthanide, an actinide, magnesium, yttrium, calcium and mixtures thereof. Yttrium oxide ("yttria") has been found to be an especially effective phase stabilizer. According to one embodiment of the present invention, the catalyst comprises less than about 0.1% stabilizer by weight. According to other embodiments the catalyst comprises less than less about 0.05% by weight, less than about 0.025% by weight, or even from about 0.025% to about 0.1% by weight and, according to further embodiment, from about 0.05% to about 0.1% by weight.

The phase stabilizer may be added to the catalyst by introducing a compound that includes the metal (e.g., a compound comprising a lanthanide, an actinide, magnesium, yttrium, calcium and mixtures thereof) to the hydrogen and oxygen flame while the inert substrate is being formed. This creates an oxide of the metal that becomes incorporated into the inert substrate structure as a stabilizing phase. The metal oxide stabilizer is inert and is not believed to have catalytic activity and is not active in the purification of silicon tetrafluoride gas.

II. Catalytically Active Metal Oxide

To form a catalytically active metal oxide (i.e., catalytic metal oxide) on or near the surface of the substrate body, the substrate body is contacted with a metal salt solution that includes the catalytically active metal. A base such as, for example, ammonium hydroxide is added to the solution to precipitate metal from the solution and onto the substrate body. According to other embodiments, the metal is deposited by an electrochemical displacement reaction or by electroless plating.

After the metal is deposited onto the substrate, the metal-impregnated inert substrate can be heated to a temperature sufficient to calcinate the catalytically active metal and form metal oxides. Calcination of the catalytically active metal generally occurs at temperatures of at least about 250° C. The metal-impregnated inert substrate may be heated to a temperature of from about 250° C. to about 1500° C., to a temperature of from about 250° C. to about 1000° C., typically to a temperature of from about 300° C. to about 850° C. or even to a temperature of from about 400° C. to about 600° C.

Without being bound to a particular theory, it is believed that the catalytically active metal oxides are located at or near the surface of the catalyst (including the surfaces of the micropores) either as a coating partially covering the inert substrate or as a continuous phase which extends into the catalyst bulk with the highest concentration of catalytically active metal oxides being found at the surface. Suitable catalytically active metal oxides include a metal such as, for example, copper, manganese, chromium, cobalt, thallium, molybdenum, silver and mixtures thereof. According to one embodiment, the metal oxide comprises copper, manganese or mixtures thereof.

In at least some embodiments of the present invention, the catalyst comprises from about 0.001% to about 1% by weight catalytic metal, from about 0.01% to about 1% by weight, from 0.1% to about 1% by weight, from about 0.5% to about 1% by weight, from 0.001% to about 0.5% by weight, from 0.001% to about 0.1% by weight or even from about 0.001% to about 0.01% by weight of catalytic metal.

The catalyst generally comprises from about 95% to about 99.999% by weight inert substrate, typically from about 95% to about 99.99% by weight, from about 95% to about 99.9% by weight, from about 95% to about 99% by weight, from about 95% to about 97.5% by weight, from 97.5% to about 99.999% by weight, from about 99% to about 99.999% by weight, from about 99.9% to about 99.999% by weight or even from about 99.99% to about 99.999% by weight of inert substrate.

In at least one embodiment, the catalyst comprises at least about 95% inert substrate by weight, less than about 3% catalytic metal by weight and less than about 0.5% stabilizer by weight.

Catalysts produced by the above process typically exhibit a substantially large surface area and relatively high porosity at the micro and bulk scales. In general, the catalyst of the present invention has a surface area from about 1 $m^2/g$ to about 1000 $m^2/g$, typically from about 1 $m^2/g$ to about 750 $m^2/g$, from about 1 $m^2/g$ to about 500 $m^2/g$, from about 1 $m^2/g$ to about 100 $m^2/g$, from about 1 $m^2/g$ to about 10 $m^2/g$, from about 10 $m^2/g$ to about 1000 $m^2/g$, from about 100 $m^2/g$ to about 1000 $m^2/g$, from about 500 $m^2/g$ to about 1000 $m^2/g$ or even from about 750 $m^2/g$ to about 1000 $m^2/g$. The bulk porosity is generally from about 30% to about 80%, typically from about 30% to about 60%, from about 30% to about 40%, from about 40% to about 80% or even from about 60% to about 80%. The micro-porosity is generally from about 1% to about 20%, from about 1% to about 15%, from about 1% to about 10%, from about 1% to about 5%, from about 5% to about 20%, from about 10% to about 20% or even from about 15% to about 20%.

Because calcination temperature can affect pore size and surface area, porosity and surface area are preferably determined after calcination of the catalyst.

2. Removal of Impurities Using the Catalytic Metal Oxide

The catalyst described above is especially well suited for removing carbon monoxide from source gases, such as, for example a silicon tetrafluoride source gas. In one embodiment of the present invention, a silicon tetrafluoride source gas comprising silicon tetrafluoride and carbon monoxide is contacted with a catalyst comprising an inert substrate and a metal oxide at or near the surface of the substrate.

Without being limited to a particular theory, it is believe that the carbon monoxide compound reacts with the metal oxide forming a metal carbonyl compound which adheres to the catalyst. The carbon monoxide is adsorbed from the silicon tetrafluoride source gas thereby reducing the concentration of carbon monoxide in the silicon tetrafluoride source gas.

The process of the present invention may be utilized to purify silicon tetrafluoride gas comprising essentially any concentration of carbon monoxide. While in practice, silicon tetrafluoride gas streams may contain extremely large concentrations of carbon monoxide, typically silicon tetrafluoride source gases typically comprise from about 0.001% to about 3.0% by volume carbon monoxide. More typically silicon tetrafluoride source gases comprise from about 30 ppm to about 30,000 ppm by volume of carbon monoxide. In general, the catalytic metal oxide purification process of the present invention may be used to remove a portion or all of the carbon monoxide. Typically, at least about 97% of the carbon monoxide of the source gas is removed and more typically at least about 99% of the carbon monoxide may be removed. In some instances, at least about 99.9% of the carbon monoxide is removed.

The silicon tetrafluoride gas is generally maintained at a temperature of from about –30° C. to about 90° C. during the catalytic metal oxide purification process. Typically, the silicon tetrafluoride gas may be maintained at a temperature of from about 0° C. to about 90° C., from about 45° C. to about 90° C., from about 70° C. to about 90° C., from about –30° C. to about 70° C., from about –30° C. to about 45° C. or even from about –30° C. to about 0° C.

In general, the rate at which the silicon tetrafluoride source gas is passed through the catalyst bed, is not narrowly critical to the present invention, so long as sufficient contact time is allowed for carbon monoxide removal. In generally, the gas is passed through the bed at a linear velocity of from about 1 cm/sec to about 200 cm/sec, typically from about 10 cm/sec to about 50 cm/sec, or even from about 17 cm/sec to about 35 cm/sec.

Any process equipment designed for contacting a gas with a solid may be used to carry out the above process. For example, fluidized bed reactors and packed columns having a material of construction suitable for the catalysts and gas being treated are suitable.

As noted above, presence of acidic compounds in the gas stream being treated by the catalyst may be detrimental to the process. In some embodiments of the present invention, therefore, it may be preferential to contact the silicon tetrafluoride source gas with an ion exchange resin to remove a portion of the acidic compounds prior to contacting the silicon tetrafluoride source gas with the catalyst. This allows for removal of hydrofluoric acid from the silicon tetrafluoride source gas prior to contact with the catalyst. It is desirable to remove hydrofluoric acid from the silicon tetrafluoride source gas prior to contacting the source gas with the catalyst because hydrofluoric acid can decompose and cause fluoride poisoning of the catalyst.

As discussed above, the carbon monoxide forms a metal carbonyl complex which adheres to an active site of the catalyst. As such, the activity of the catalyst will decrease over time as more sites are blocked by metal carbonyl complexes. While the catalyst could be simply discarded and a new catalyst inserted, for economic and environmental reasons it is preferred to regenerate at least a portion or all of the catalyst. The catalyst may be regenerated by heating the catalyst to a temperature sufficient to cause the metal carbonyl complex to decompose forming carbon oxides which are then released from the catalyst surface. For example, the catalyst may be heated to a temperature of at least about 500° C., at least about 700° C. or even higher. Typically the catalyst is heated to a temperature within the range of from about 500° C. to about 1400° C., from about 500° C. to about 1000° C., from about 500° C. to about 700° C. or even from about 500° C. to about 570° C. while a gaseous effluent is passed through the reaction vessel.

C. Removal of Carbon Dioxide by use of an Absorption Fluid

Silicon tetrafluoride often contains from about 2% by volume to about 3% by volume carbon dioxide. The silicon tetrafluoride source gas may be purified by removing an amount of carbon dioxide from the gas. According to one embodiment of the invention, an amount of carbon dioxide is removed by contacting the silicon tetrafluoride gas by an absorption fluid. According to a further embodiment, the absorption fluid comprises a glycol diether (i.e., "glyme") such as, for example, ethylene glycol dimethyl ether, diethylene glycol dimethyl ether, triethylene glycol dimethyl ether, tetraethylene glycol dimethyl ether, polyethylene glycol dimethyl ether, ethylene glycol diethyl ether, diethylene glycol diethyl ether, diethylene glycol dibutyl ether, ethyoxy tert-butoxy ethane and mixtures thereof. Contacting the silicon tetrafluoride source gas with glycol diether reduces the amount of carbon dioxide gas in the silicon tetrafluoride source gas to less than about 2% by volume. According to other embodiments of the present invention, contacting the silicon tetrafluoride source gas with a glycol diether reduces the amount of carbon dioxide gas in the silicon tetrafluoride source gas to less than about 0.5 ppm by volume and, according to another embodiment to less than about 0.1 ppm by volume.

A variety of process equipment may be used to contact the silicon tetrafluoride gas with the absorption liquid such as, for example, an absorption column. The absorption liquid may be regenerated by desorbing the carbon dioxide in a desorption column by passing a stripping gas through the column.

D. Removal of Inert Compounds by use of Cryogenic Distillation

Silicon tetrafluoride often comprises an amount of inert gases such as, for example, nitrogen. Typically the silicon tetrafluoride source gas contains from about 0.5% to about 10% by volume of inert compounds. These inert compounds can be removed by cryogenic distillation. Cryogenic distillation involves cooling of the silicon tetrafluoride source gas to a cryogenic temperature, typically from about −200° C. to about −50° C. According to another embodiment the silicon tetrafluoride is cooled to from about −90° C. to about −60° C. The cooled silicon tetrafluoride source gas is fed to a distillation column to produce a purified silicon tetrafluoride gas stream having a reduced concentration of inert compounds. The cryogenic distillation process may involve a series of distillation zones that may operate at different pressures.

The cryogenic distillation step may occur before or after the silicon tetrafluoride source gas is contacted with the catalyst of embodiments of the present invention (i.e., before or after carbon monoxide removal) and may occur before of after contact with the ion exchange resin (i.e., before or after acid gas removal). In one embodiment, the silicon tetrafluoride source gas is cooled to a cryogenic temperature and fed to a distillation column subsequent to contacting the silicon tetrafluoride source gas with the catalyst.

Cryogenic distillation typically removes at least about 95% of the inert compounds in the source gas and, more typically, at last about 98% of the inert compounds. According to another embodiment, the cryogenic distillation process removes at least about 99% of the inert compounds and, according to a further embodiment at least about 99.9% of the inert compounds.

Example 1

Figure 2:
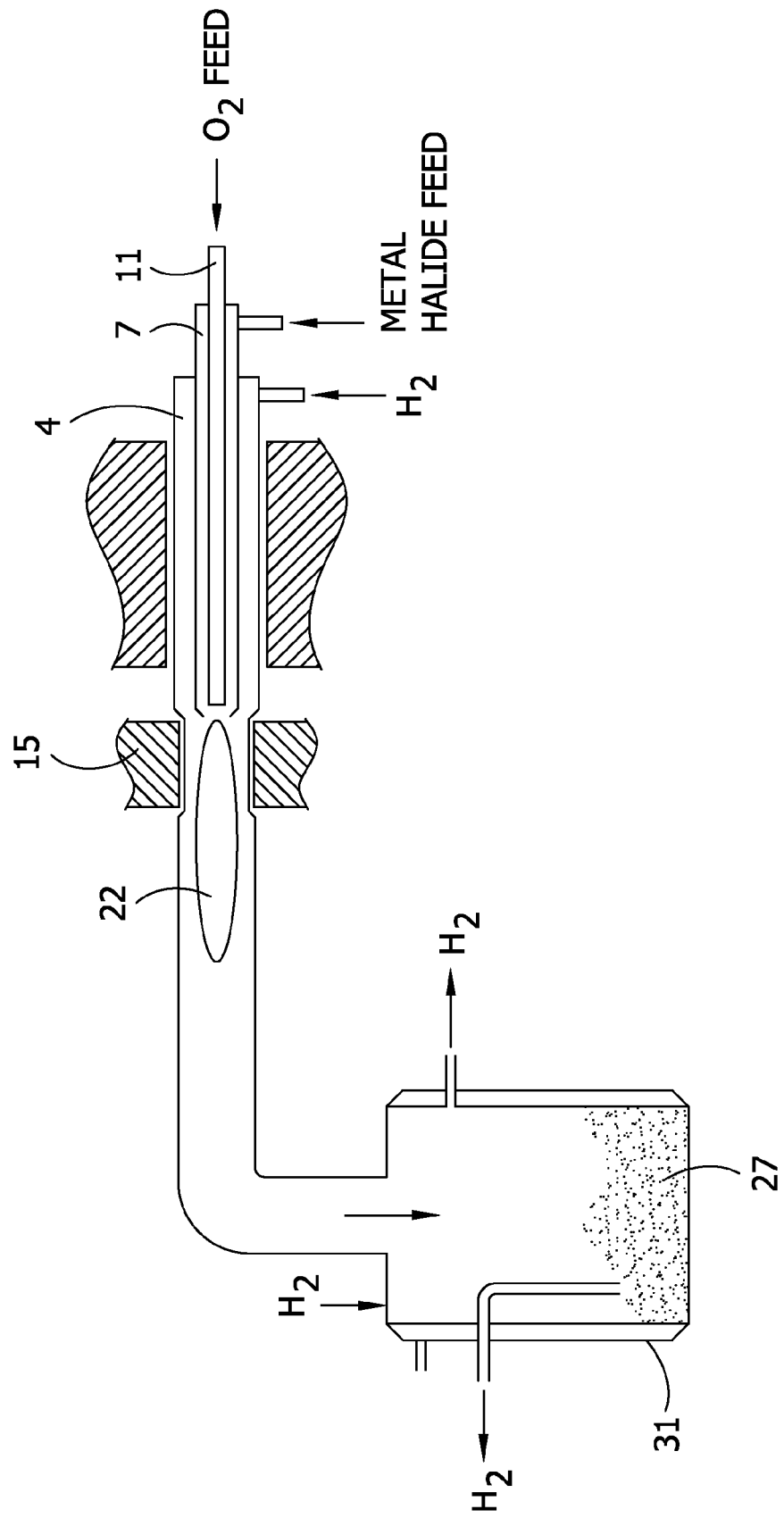
FIG. 2 is a cross-section of the reaction apparatus used to prepare the inert substrate of the catalyst as set forth in Example 1.

Preparation of a Catalyst Comprising Catalytic Copper and Manganese Oxides on or Near the Surface of a Zirconia Substrate Referring now to FIG. 2, zirconia was prepared by reacting zirconium chloride and hydrogen in a hydrogen and oxygen flame 22. Three concentric tubes 4,7,11 were used to transport the reactant gases. Oxygen gas was fed through the innermost tube 11, metal halides through the middle tube 7 and hydrogen through the outermost tube 4. To prepare zirconia, a mixture of zirconium chloride and inert argon gas was fed through the middle tube 7. Hydrogen was fed up to 50% in excess of its stoichiometric amount. The flame temperature was maintained around about 800° C. by controlling the hydrogen and inert gas flow rates. The gases were passed over an electrode 15. The resulting zirconia powder 27 was collected in a receiver 31. The zirconia power product 27 was quickly quenched by injecting cold hydrogen gas in the receiver 31. Hydrogen chloride was separated out by maintaining a differential temperature.

In some cases yttria (i.e., yttrium oxide) was used as a stabilizing compound. Yttrium chloride was concurrently fed with the zirconium chloride to co-generate yttrium oxide and zirconium oxide.

In some cases copper chloride and manganese chloride were added with the zirconium chloride in the middle tube 7 to co-generate zirconia and catalytic copper and manganese oxides.

The zirconium powder product was compacted with an organic binder (polyvinyl alcohol) in an amount of 8 parts per 100 parts of the dried powder. A molded body in the shape of a circular plate (35 mm diameter; 8 mm thickness) was formed by press molding. The molded body was maintained in an argon atmosphere at 400° C. for three hours to remove the binder. The molded body was then heated to 750° C. for one hour and cooled under vacuum to generate macro and micro pores by the desorption of hydrogen. Equal amounts of manganese and copper solutions (5% by weight of copper and 5% by weight of manganese with respect to the final catalyst) were added to a container that held the molded body for half an hour. The manganese and copper were precipitated out of solution with ammonium hydroxide. The liquid was drained out and the resulting mass was heated to 1400° C. under slight vacuum for two hours.

Zirconia powder produced by the above process has an average pore size diameter of less than about 1 nm and a surface area greater than about 100 $m^2/g$. Pore volume and pore sizes were determined by the Brunauer-Emmett-Teller method. Pore volumes for pores smaller than 65 nm in diameter were measured using a mercury porosimeter, in accordance with ASTM standard D 4284-83. Pore volumes for micropores smaller than 1.5 nm in diameter were determined by the xenon NMR method, as described by Fraissard, *Jour-* nal de Chimie Physique, 6, 83 (1986). Porosity and surface area where measured both before and after calcination.

It is mentioned in the literature that an increase in the calcination temperature or the temperature at which a given porous product is actually used is known to this art to effect a decrease in specific surface area and pore volume. However, this was not observed with this material within the temperature range of calcination.

Example 2

Use of a Catalyst Comprising Catalytic Copper and Manganese Oxides on or Near the Surface of a Zirconia Substrate to Remove Carbon Monoxide from Silicon Tetrafluoride Source Gas Containing other Contaminates Silicon tertrafluoride gas containing around 3000 ppm carbon monoxide was passed over a bed of catalyst (15 cm long; 4 cm in diameter) at a linear velocity of 1 cm/sec and a pressure of 1-5 atmospheres and at 15° C. The carbon monoxide concentration was reduced to less than 1 ppm.

Example 3

Use of a Catalyst Comprising Catalytic Copper and Manganese Oxides on or Near the Surface of a Zirconia Substrate to Remove Carbon Monoxide from Silicon Tetrafluoride Source Gas Substantially Free from other Contaminates Silicon tetrafluoride gas containing 1% carbon monoxide was passed over a bed of catalyst (15 cm long; 4 cm in diameter) at a linear velocity of 1 cm/sec and a pressure of 1-5 atmospheres and at 15° C. The carbon monoxide concentration was reduced to less than 1 ppm.

Example 4

Use of a Catalyst Prepared by Precipitating Catalytic Metal onto the Surface of the Catalyst Silicon tetrafluoride gas containing 540 ppm carbon monoxide was passed over a bed of (15 cm long; 4 cm in diameter) at 24° C. The catalyst was prepared by precipitating catalytic manganese and copper onto the surface of the catalyst. Several runs at various linear velocities and before and after regeneration of the catalyst were conducted. The results are shown below in Table 1.

TABLE 1

Activity for Carbon Monoxide Removal from a Silicon Tetrafluoride Source Gas Using a Catalyst Prepared by Depositing Catalytic Metal

| Linear Velocity (cm/sec) | Time (min) | Before or After Catalyst Regeneration | Exit CO Concentration with Zirconia Support (ppm) |
| --- | --- | --- | --- |
| 15 | 5 | Before | 1.75 |
| 15 | 30 | Before | 1.41 |
| 15 | 60 | Before | 2.75 |
| 25 | 5 | Before | 8.20 |
| 25 | 30 | Before | 9.17 |
| 25 | 60 | Before | 11.20 |
| 15 | 5 | After | 4.87 |
| 15 | 30 | After | 8.55 |
| 15 | 60 | After | 9.23 |
| 25 | 5 | After | 10.90 |

TABLE 1-continued

Activity for Carbon Monoxide Removal from a Silicon Tetrafluoride Source Gas Using a Catalyst Prepared by Depositing Catalytic Metal

| Linear Velocity (cm/sec) | Time (min) | Before or After Catalyst Regeneration | Exit CO Concentration with Zirconia Support (ppm) |
| --- | --- | --- | --- |
| 25 | 30 | After | 11.23 |
| 25 | 60 | After | 12.34 |

Example 5

Use of a Catalyst Comprising Catalytic Copper and Manganese Oxides on or Near the Surface of a Zirconia Substrate to Remove Carbon Monoxide from Silicon Tetrafluoride Source Gas Silicon tetrafluoride gas containing 540 ppm carbon monoxide was passed over a bed of catalyst (15 cm long; 4 cm in diameter) at 24° C. Several runs at various linear velocities and before and after regeneration of the catalyst were conducted. The results are shown below in Table 2.

TABLE 2

Activity toward Carbon Monoxide Removal from a Silicon Tetrafluoride Source Gas

| Linear Velocity (cm/sec) | Time (min) | Before or After Catalyst Regeneration | Exit CO Concentration with Zirconia Support (ppm) |
| --- | --- | --- | --- |
| 15 | 5 | Before | 0.50 |
| 15 | 30 | Before | 0.49 |
| 15 | 60 | Before | 0.61 |
| 25 | 5 | Before | 1.10 |
| 25 | 30 | Before | 2.05 |
| 25 | 60 | Before | 1.20 |
| 15 | 5 | After | 0.49 |
| 15 | 30 | After | 0.53 |
| 15 | 60 | After | 0.59 |
| 25 | 5 | After | 0.92 |
| 25 | 30 | After | 1.01 |
| 25 | 60 | After | 2.11 |

Example 6

Comparison of Copper Monoxide Removal Activity Between a Catalyst Based on a Zirconia Substrate and a Catalyst Based on an Alumina silicate Substrate Alumina silicate powder was prepared. The surface area and porosity of the alumina silicate powder support was 10% greater than the zirconia support. However, as can be seen in Table 3 below, catalysts based on alumina silicate substrates did not remove as much carbon monoxide as catalysts based on manganese supports. In the comparative test, the silicon tetrafluoride source gas contained 540 ppm of carbon monoxide and was at a temperature of 24° C. The catalyst bed was 15 cm long and was 4 cm in diameter.

TABLE 3

Comparison of Carbon Monoxide Removal from a Silicon Tetrafluoride Source Gas between a Catalyst with a Zirconia Substrate and an Alumina Substrate

| Linear Velocity (cm/sec) | Before or After Catalyst Regeneration | Exit CO Concentration with Zirconia Support (ppm) | Exit CO Concentration with Alumina Silicate Support (ppm) |
|---|---|---|---|
| 10 | Before | 0.40 | 2.1 |
| 25 | Before | 0.45 | 2.0 |
| 10 | After | 0.47 | 17.8 |
| 25 | After | 0.44 | 9.1 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods without departing from the scope of the invention, it is intended that all matter contained in the above description and shown in the accompanying drawings shall be interpreted as illustrative and not in a limiting sense.

What is claimed is:

1. A process for producing a purified silicon tetrafluoride gas, the process comprising:
    contacting a silicon tetrafluoride source gas comprising silicon tetrafluoride and carbon monoxide with a catalyst comprising an inert substrate having a surface and a catalytic metal oxide at or near the surface, the catalytic metal oxide comprising a catalytic metal selected from the group consisting of copper, manganese, chromium, cobalt, thallium, molybdenum, silver and mixtures thereof; and
    adsorbing at least a portion of the carbon monoxide onto the surface of the catalyst by reacting the carbon monoxide with the catalytic metal oxide to form one or more metal carbonyl complexes adhered to the catalyst, thereby producing a purified silicon tetrafluoride gas stream having a reduced concentration of carbon monoxide.

2. A process as set forth in claim 1 wherein the catalytic metal oxide comprises copper, manganese or mixtures thereof.

3. A process as set forth in claim 1 wherein the inert substrate is selected from the group consisting of zirconia, alumina silicate, silica, alumina, yttria and mixtures thereof.

4. A process as set forth in claim 3 wherein the inert substrate comprises zirconia, alumina silicate or mixtures thereof.

5. A process as set forth in claim 1 wherein the inert substrate comprises a metal oxide stabilizer comprising a metal selected from the group consisting of lanthanides, actinides, magnesium, yttrium, calcium and mixtures thereof.

6. A process as set forth in claim 5 wherein the inert substrate comprises less than about 0.1% by weight stabilizer.

7. A process as set forth in claim 1 wherein the inert substrate comprises yttrium oxide as a stabilizer.

8. A process as set forth in claim 1 wherein the silicon tetrafluoride source gas comprises from about 0.001% to about 3.0% by volume carbon monoxide.

9. A process as set forth in claim 1 wherein the catalyst comprises from about 0.001% to about 1.0% by weight catalytic metal.

10. A process as set forth in claim 1 wherein the catalyst comprises about 95% to about 99.999% by weight inert substrate.

11. A process as set forth in claim 1 wherein the inert substrate has a surface area from about 1 $m^2/g$ to about 1000 $m^2/g$.

12. A process as set forth in claim 1 wherein the inert substrate has a bulk porosity of from about 30% to about 80%.

13. A process as set forth in claim 1 wherein the inert substrate has a micro-porosity of from about 1% to about 20%.

14. A process as set forth in claim 1 wherein at least about 97% of the carbon monoxide in the silicon tetrafluoride source gas is removed.

15. A process as set forth in claim 1 wherein the silicon tetrafluoride source gas comprises acidic compounds selected from the group consisting of hydrogen fluoride, hydrochloric acid, sulfur dioxide, sulfur trioxide, hydrogen sulfide, and mixtures thereof and wherein a portion of the silicon tetrafluoride source gas is contacted with an ion exchange resin to produce a purified silicon tetrafluoride gas stream having a reduced concentration of acidic compounds.

16. A process as set forth in claim 15 wherein the silicon tetrafluoride source gas is contacted with the ion exchange resin to remove a portion of the acidic compounds prior to contacting the silicon tetrafluoride source gas with the catalyst.

17. A process as set forth in claim 1 wherein the silicon tetrafluoride source gas comprises inert compounds and wherein:
    the silicon tetrafluoride source gas is cooled to a cryogenic temperature; and
    the cooled silicon tetrafluoride source gas is fed to a distillation column to produce a purified silicon tetrafluoride gas stream having a reduced concentration of inert compounds.

18. A process as set forth in claim 17 wherein the silicon tetrafluoride source gas is cooled to a cryogenic temperature and fed to a distillation column subsequent to contacting the silicon tetrafluoride source gas with the catalyst.

19. A process as set forth in claim 1 wherein the silicon tetrafluoride source gas comprises carbon dioxide and a portion of the carbon dioxide is removed by contacting the silicon tetrafluoride gas by an absorption liquid comprising at least one glycol diether.

20. A process as set forth in claim 1 wherein the catalyst is regenerated by heating the catalyst and the metal carbonyl complexes adhered thereto to a temperature of from about 500° C. to about 570° C. to decompose the metal carbonyl complexes and form carbon oxides, the carbon oxides being released from the catalyst.

21. A process as set forth in claim 1 wherein the silicon tetrafluoride source gas is contacted with the catalyst at a temperature of from about −30° C. to about 90° C.

22. A process as set forth in claim 1 wherein the silicon tetrafluoride source gas is contacted with the catalyst at a linear velocity of from about 1 cm/sec to about 200 cm/sec.

23. A process as set forth in claim 1 wherein the catalyst is regenerated by heating the catalyst and the metal carbonyl complexes adhered thereto to a temperature of at least about 500° C. to decompose the metal carbonyl complexes and form carbon oxides, the carbon oxides being released from the catalyst.

24. A process as set forth in claim 1 wherein the catalyst is regenerated by heating the catalyst and the metal carbonyl complexes adhered thereto to a temperature of at least about 700° C. to decompose the metal carbonyl complexes and form carbon oxides, the carbon oxides being released.

* * * * *